(12) United States Patent
Balestrazzi et al.

(10) Patent No.: US 10,540,322 B2
(45) Date of Patent: Jan. 21, 2020

(54) INTEGRATED FILE CATALOG

(71) Applicant: INTERNATIONAL BUSINESS MACHINES CORPORATION, Armonk, NY (US)

(72) Inventors: Luca Balestrazzi, Rome (IT); Fabio De Angelis, Albano Laziale (IT); Andrea Napoleoni, Arsoli (IT); Stefano Sidoti, Rome (IT)

(73) Assignee: International Business Machines Corporation, Armonk, NY (US)

(*) Notice: Subject to any disclaimer, the term of this patent is extended or adjusted under 35 U.S.C. 154(b) by 325 days.

(21) Appl. No.: 15/220,253

(22) Filed: Jul. 26, 2016

(65) Prior Publication Data

US 2018/0032538 A1 Feb. 1, 2018

(51) Int. Cl.
*G06F 16/13* (2019.01)
*H04L 29/08* (2006.01)
*H04L 12/58* (2006.01)
*G06F 16/182* (2019.01)

(52) U.S. Cl.
CPC .......... *G06F 16/137* (2019.01); *G06F 16/183* (2019.01); *H04L 51/22* (2013.01); *H04L 67/06* (2013.01)

(58) Field of Classification Search
USPC ........................................................ 707/827
See application file for complete search history.

(56) References Cited

U.S. PATENT DOCUMENTS

| 5,748,954 A * | 5/1998 | Mauldin ........... G06F 17/30864 |
| 7,480,067 B2 | 1/2009 | Buschi et al. |
| 8,527,608 B2 | 9/2013 | Wilson |
| 2007/0050423 A1* | 3/2007 | Whalen ............. G06F 17/30159 |
| 2008/0134048 A1* | 6/2008 | Leibow .................. G06Q 30/02 |
| | | 715/738 |
| 2013/0198339 A1 | 8/2013 | Lee |

FOREIGN PATENT DOCUMENTS

EP        2095306 B1    7/2011

* cited by examiner

*Primary Examiner* — Muluemebet Gurmu
(74) *Attorney, Agent, or Firm* — Patterson + Sheridan, LLP

(57) ABSTRACT

Systems, methods, and computer program products to perform an operation comprising receiving a request to download a first object by a first computing device, wherein the first computing device is of a plurality of computing devices in a local area network (LAN), referencing an object catalog in a mail server using an identifier associated with the first object, and upon determining that the object catalog does not include the identifier of the first object, storing the first object at a first storage location of a first storage device associated with the first computing device, computing a hash value for the first object, and storing, in the object catalog, indications of the hash value, the first storage device, and the first storage location of the first storage device in a record associated with the first object.

20 Claims, 8 Drawing Sheets

| FROM | SUBJECT | RECEIVED | ATTACHMENT |
|---|---|---|---|
| MOM | HI | MAY 2, 2016, 5:00 PM | Card.jpg |

Files in your catalog:

| FILENAME | SIZE |
|---|---|
| FILE1.TXT | 30 KB |
| FILE2.EXE | 3 MB |
| FILE3.JPG | 1.5 MB |

Enter search terms here 🔍

Click to install: User Profile Module

Card.jpg, which you requested to download, is available from the following locations:

- This device
- Internet location  } 211
- Your smartphone
- Your home desktop

Choose from the following options:

- Download from location selected above
- Open the file from location selected above
- Cancel

212

Submit ~213    Cancel ~214

INTEGRATED FILE CATALOG

BACKGROUND

The present invention relates to computer software, and more specifically, to computer software which provides a file catalog integrated with an email system.

The number of files used by a person can easily grow into the hundreds, thousands, and beyond. These files can originate from any number of sources, such as direct downloads from the Internet, or being received as an email attachment. The management of downloaded files is time consuming, as a user often accesses many machines, and can download files from each of these machines. As such, users often download a single file multiple times to different machines. Furthermore, users are often unable to recall where a given file is located, regardless of the number of times it has been downloaded, especially when the file is moved to a different storage location after it is downloaded. Furthermore, available solutions are not able to manage both the files downloaded from the internet and files saved from email attachments.

SUMMARY

In one embodiment, a method includes receiving a request to download a first object by a first computing device, wherein the first computing device is of a plurality of computing devices in a local area network (LAN), and performing a download operation to download the first object. The download operation comprises referencing an object catalog in a mail server using an identifier associated with the first object. Upon determining that the object catalog does not include the identifier of the first object, the first object is stored at a first location of a first storage device associated with the first computing device. This method may also include computing a hash value for the first object, and storing, in the object catalog, indications of the hash value, the first storage device. The first storage location of the first storage device in a record associated with the first object.

In another embodiment, a system comprises a processor and a memory storing instructions, which when executed by the processor, performs an operation which includes receiving a request to download a first object by a first computing device, wherein the first computing device is of a plurality of computing devices in a local area network (LAN), and performing a download operation to download the first object. The download operation comprises referencing an object catalog in a mail server using an identifier associated with the first object. Upon determining that the object catalog does not include the identifier of the first object, the first object is stored at a first location of a first storage device associated with the first computing device. This operation may also include computing a hash value for the first object, and storing, in the object catalog, indications of the hash value, the first storage device. The first storage location of the first storage device in a record associated with the first object.

In another embodiment, a computer-readable storage medium has computer-readable program code embodied therewith, the computer-readable program code executable by a processor to perform an operation which includes receiving a request to download a first object by a first computing device, wherein the first computing device is of a plurality of computing devices in a local area network (LAN), and performing a download operation to download the first object. The download operation comprises referencing an object catalog in a mail server using an identifier associated with the first object. Upon determining that the object catalog does not include the identifier of the first object, the first object is stored at a first location of a first storage device associated with the first computing device. This operation may also include computing a hash value for the first object, and storing, in the object catalog, indications of the hash value, the first storage device. The first storage location of the first storage device in a record associated with the first object.

BRIEF DESCRIPTION OF THE SEVERAL VIEWS OF THE DRAWINGS

FIGS. 2A-2B illustrate graphical user interfaces for an integrated file catalog, according to various embodiments.

DETAILED DESCRIPTION

Embodiments disclosed herein provide techniques to manage files (and other objects) downloaded from the Internet and saved from email attachments by providing a file catalog in email server. Generally, whenever a file is downloaded or saved from an email attachment, embodiments disclosed herein generate information related to the file which is stored, managed, and reused by the file catalog. For example, a user may download and save a first file to a first computer. The file catalog may be enriched with metadata describing the first file, including its storage location on the first computer. When a user subsequently attempts to download the first file from a different computer, the first file may be downloaded from the first computer, reducing external network traffic and saving time. Similarly, if the user attempts to re-download the first file from the first computer, the user may be informed that the first file already exists on the first computer, again reducing external network traffic and saving time. Doing so allows users to understand which files have been saved, and where they are located, which saves storage space, external network traffic, and other computing resources by eliminating redundant download operations.

Figure 1:
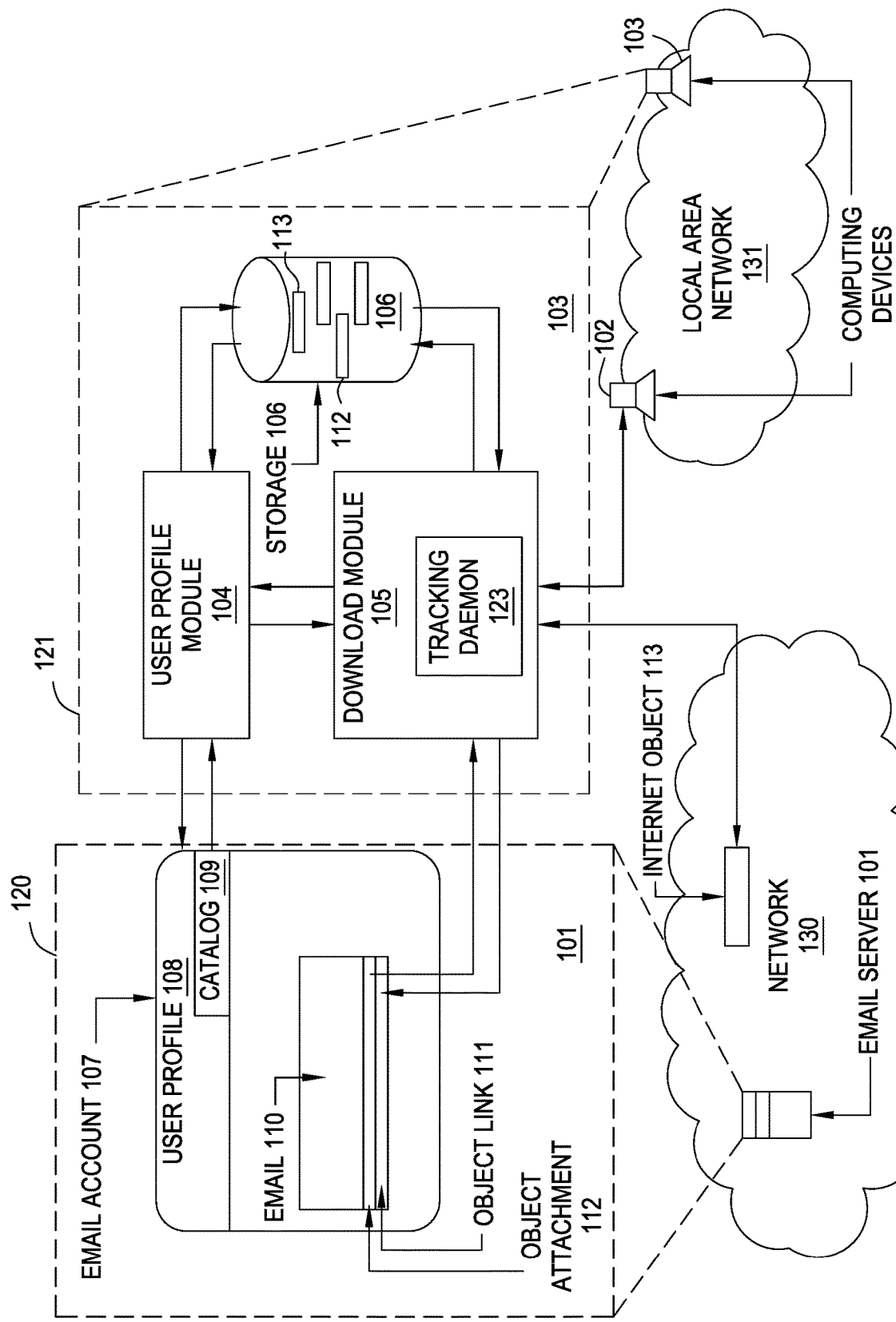
FIG. 1 illustrates an example system architecture which provides an integrated file catalog, according to one embodiment.

FIG. 1 illustrates an example system architecture 100 which provides an integrated file catalog, according to one embodiment. As shown, the system 100 includes an email server 101, computing devices 102-103, and an Internet object 113. The computing devices 102, 103 are representative of any type of computing device, such as a desktop computer, server, laptop computer, smartphone, tablet, and the like. The computing devices 102, 103 are communicably coupled via a local area network (LAN) 131. The computing devices 102, 103 may communicate with the email server 101 via the network 130. In at least one embodiment, the network 130 is the Internet.

Components of the email server 101 are illustratively depicted in box 120. Specifically, the email server 101 includes an example email account 107, which is of a plurality of email accounts provided to users registering for an email account provided by the email server 101. As shown, the email account 107 includes a user profile 108, a catalog 109, and an example email 110. The user profile 108 includes a plurality of attributes of a user associated with the email account 107, such as email alias, first name, last name, associated devices, and the like. The catalog 109 is a data store configured to maintain metadata of objects saved by users. The metadata stored in the catalog 109 may be related to any type of file or portion thereof, such as files downloaded from the internet, email attachments saved by users, and files downloaded from peer devices (e.g., where computing device 102 receives at least a portion of a file from device 103). As shown, in at least one embodiment, the catalog 109 is stored in the user profile 108. The object metadata stored in the catalog 109 may include, for example and without limitation, a name of the object, a hash value for the object (which may be computed by any suitable hash function applied to the object), a size of the object, a path to a location of the object, and a set of devices that are currently storing the object.

The email 110 is an electronic mail message, which illustratively includes an object link 111 and an object attachment 112. The object link is representative of a uniform resource locator (URL) that points to a location of an attachment (e.g., the storage 106). The object attachment 112 is representative of a file or other object that may be attached to an email, and detached by a recipient for storage.

Components of the computing device 103 are depicted in box 121. Generally, the computing device 102 may include the same components as computing device 103. As shown, the computing device 103 includes a user profile module 104, a download module 105, and a storage 106. The user profile module 104 is an enhanced module which interacts with the email account 107 (including the catalog 109) for a user who is authenticated with the user profile module 104. More generally, the user profile module 104 manages access to the catalog 109 and allows users to create and modify a user profile 108. Once a user has created an account 107, the email server 101 may create a corresponding user profile 108 and catalog 109. The user profile module 104 may then require the user to download the download module 105. Doing so allows the download module 105 to capture every download or attachment detach operation (e.g., a save operation) performed by the user associated with the user profile 108. The user profile module 104 may also install a link to the catalog 109 on the computing system 103, such as in a user interface of a web browser installed on the computing system 103. Doing so allows a user to browse their catalog at all times. The user profile module 104 may provide a graphical user interface (GUI) which allows users to access the catalog 109 and select a file displayed on the GUI. If a file selected by the user is present on the local device, the file is opened. However, if the file is not present on the local device, the download module 105 attempts to download the file from one or more of the locations where it is present (e.g., on a device in the LAN 131). Since a user may access the email account 107 from any number of devices, the user may also access their catalog 109 from any devices where the user profile module 104 is installed.

The download module 105 is configured to intercept download and detach operations requested by a user of the computing device 103. The download module 105 may identify download and detach operations by any means, such as based on parameters of a network request generated by an email client, web browser, or other application executing on the computing device 103. When the download module 105 identifies an email detach operation (e.g., a save operation) and/or a download operation, the download module 105 may determine attributes of the requested file. For example, the download module 105 may compute a hash for the file, determine the size of the file, and create a dynamic link between the file and any storage locations where the file is saved. The download module 105 may then store these file attributes in the catalog 109.

If operation intercepted by the download module 105 specifies to detach an object (e.g., an object attachment 112) attached to an email (e.g., the email 110), the download module 105 may determine whether an entry corresponding to the object attachment 112 exists in the catalog 109. In at least one embodiment, to determine whether the entry exists, the download module 105 may compute a hash value of the object attachment 112, and determine whether an entry in the catalog 109 includes a hash value which matches the computed hash value. If an entry does not exist, the download module 105 may provide the user with an option to save the object attachment 112 at a storage location selected by the user (e.g., the storage 106). If an entry for the object in the catalog 109 exists, the download module 105 may provide the user with an indication that the user has previously saved the object, and provides the user with several options to proceed. In a first option, the user may choose to save the object. In a second option, the user may have the option to open the object at one or more locations in the system 100 where the object is stored. In a third option, the user may cancel the detach operation. If the user selects the first option, the download module 105 may present the user with an interface to save the object attachment 112 at a storage location selected by the user. If the user selects the second option, the download module 105 may read all of the information about the object attachment 112 in the catalog 109, which includes a link to a location in the system 100 (e.g., the storage 106). The download module 105 may then open the object attachment 112 from the storage location. In one embodiment, the object attachment 112 is opened in read-only mode. If the user wishes, the user may then save the object attachment 112 to a different storage location. If the user selects the third option, the detach operation is canceled and the object is not saved. In at least one embodiment, the user may specify to delete the object attachment 112 from the email 110 after the object attachment 112 has been saved to the storage 106. In such an embodiment, the download module 105 may replace the object attachment 112 from the email 110 with the object link 111, which may point to the location where the object attachment 112 has been saved (e.g., the storage 106). However, as shown in FIG. 1, the object link 111 may be added to the email 110 along with the object attachment 112 (e.g., when the user does not specify to delete the object attachment 112). Generally, when the user selects the object link 111, the download module 105 may read the information in the catalog 109 for the object attachment 112, and dynamically build a link to the object, allowing the user to view the object attachment 112.

If operation intercepted by the download module 105 specifies to download an object (e.g., the object 113) from the Internet, the download module 105 may determine whether an entry corresponding to the object 113 exists in the catalog 109. The download module 105 may determine whether the entry exists based on one or more of a hash value computed for the object, the URL of the object, and a name of the object. If an entry does not exist, the download module 105 may provide the user with an option to save the object 113 at a storage location selected by the user (e.g., the storage 106). If an entry for the object 113 in the catalog 109 exists, the download module 105 may provide the user with an indication that the user has previously saved the object 113, and provides the user with several options to proceed. In a first option, the user may choose to save the object 113. In a second option, the user may have the option to open the object at one or more locations in the system 100 where the object 113 is stored. In a third option, the user may cancel the download operation. If the user selects the first option, the download module 105 may present the user with an interface to save the object 113 at a storage location selected by the user. If the user selects the second option, the download module 105 may read all of the information about the object 113 in the catalog 109, which includes a link to a location in the system 100 (e.g., the storage 106). The download module 105 may then open the object from the storage location. In one embodiment, the object is opened in read-only mode. If the user wishes, the user may then save the object to a different storage location. If the user selects the third option, the download operation is canceled and the object is not saved.

Whenever the user specifies to save an object (as part of a detach or download operation), the download module 105 may compute a hash value for the object. The download module 105 may further determine a name of the object, a size of the object, a destination path where the object has been saved, and a name of the computing device where the object is saved. The download module 105 may then create an entry for the object in the catalog 109, where the entry includes the hash value, name, size, path, and computing device metadata. In embodiments, where the object is downloaded from the Internet, the download module 105 may further store the URL of the object as metadata of the object in the catalog 109.

As shown, the download module 105 also includes a tracking daemon 123. The tracking daemon 123 is configured to monitor the storage 106 for changes made therein. If the tracking daemon 123 detects a change (e.g., a file is deleted, moved, or otherwise modified), the tracking daemon 123 may invoke the download module 105 to update the metadata in the catalog 109 accordingly. For example, if the tracking daemon 123 determines that the user has deleted an object (e.g., the object 113 from the storage 106), the tracking daemon 123 may invoke the download module 105 to update the catalog 109 to reflect that the object is no longer stored at that location. Generally, whenever a user logs into their email account from a given device, the tracking daemon 123 may determine whether the files associated with that device in the catalog 109 are still present on the device. If the tracking daemon 123 determines that files are not found on the storage of the device, the download module 105 may update the catalog 109 to reflect that the files are no longer stored on that device.

In at least one embodiment, the user profile module 104, the download module 103, and the tracking daemon 123 communicate with the email server 101 (and other devices, such as the computing devices 102, 103) via the Simple Mail Transfer Protocol (SMTP). For example, the user profile module 104 may download a list of objects from the catalog 109 via the SMTP protocol, and retrieve files from storage locations in the LAN 131 via the SMTP protocol.

Figure 2A:
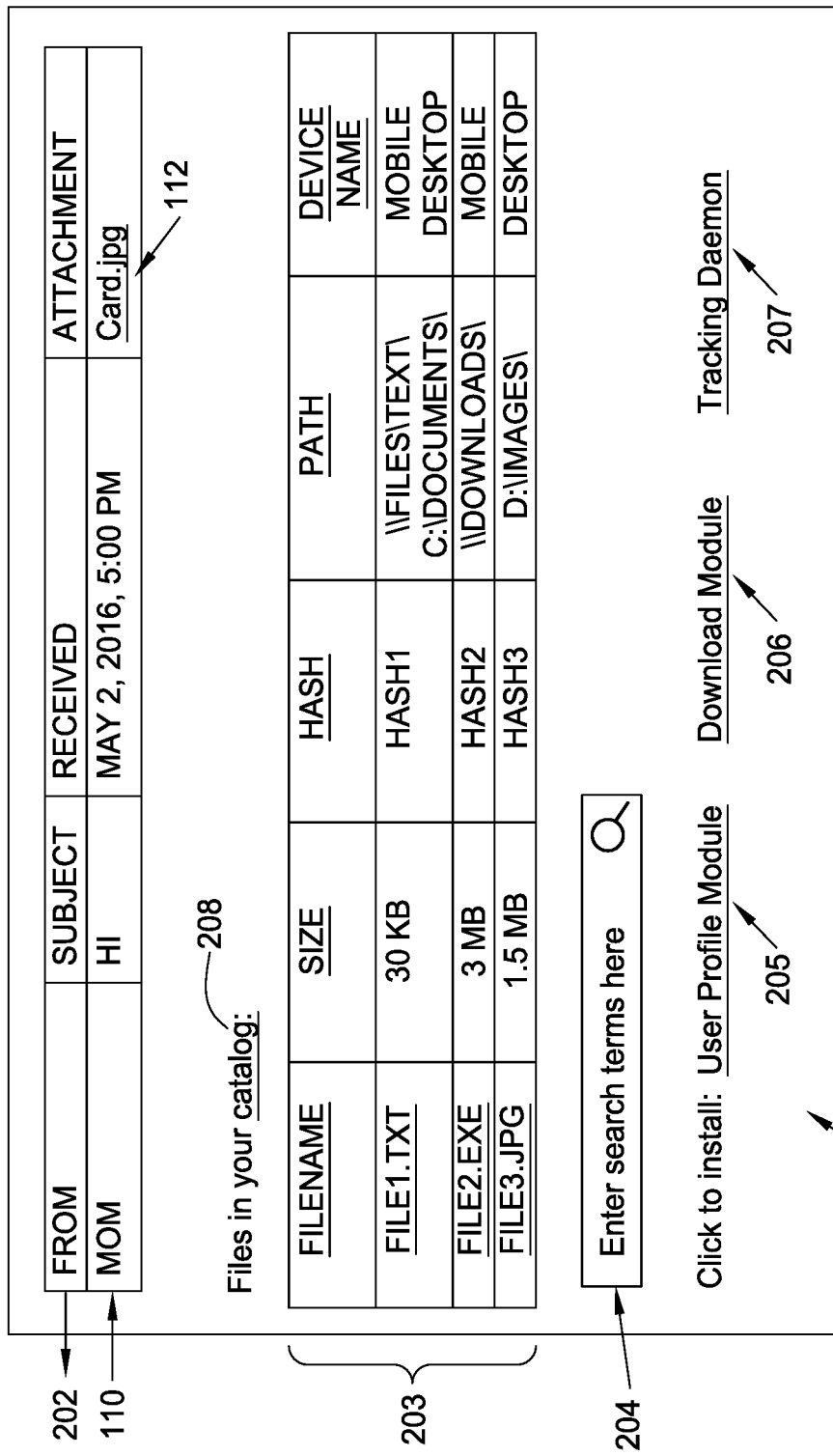

FIG. 2A illustrates a graphical user interface (GUI) 201 for an integrated file catalog, according to one embodiment. As shown, the GUI 201 includes an email interface 202, which displays one or more emails in the email account 107 of the user. Illustratively, an email 110 including the object attachment 112 is displayed in the email interface 202. The GUI 201 also includes a catalog interface 203 detailing information of files in the user's catalog 109. The user may view the catalog interface 203 by selecting a link 208 to view the catalog 109. As shown, the catalog interface 203 displays, for each object having metadata in the catalog 109, an object filename, an object size, an object hash, a path to storage instances of the object, and a device associated with each storage instance.

For example, as shown, the object "file1.txt" is 30 KB in size, has an example hash value of HASH1, two paths, and two associated device names. The two paths are "\\Files\text\" and "c:\documents", reflecting that file1.txt has been stored at these storage locations of the associated device, namely "mobile" and "desktop", respectively. Therefore, as shown, the user has previously saved "file1.txt" to a mobile device and a desktop computer. The user may select the files (e.g., by clicking on the file name, the file path, and the like) to open the file.

The GUI 201 also includes a search box 204, which allows a user to specify a name, hash, or other metadata attribute as a search string. When submitted, the GUI 201 may reference the user's catalog 109 to determine whether matching objects exist. If so, the GUI 201 may update the catalog interface 203 to reflect the matching objects.

As shown, the GUI 201 includes links 205-207 to download the user profile module 104, the download module 105, and the tracking daemon 123, respectively. These objects may be installed on the user's computing device to implement the functionality described herein.

FIG. 2B illustrates the GUI 201 after a user has specified to download the attachment object 112, according to one embodiment. As shown, the GUI 201 now includes a notification box 210 indicating that "card.jpg" (the object attachment 112) is already associated with their user profile. The notification box 210 includes a list 211 of locations where the object attachment 112 is stored. The notification box 210 further includes a list 212 of options that the user may choose from. For example, the user may select one of the locations 211 and specify to download the file from that location to the current device. As another example, the user may open the file for viewing from one of the locations. As another example, the user may cancel the operation. Once the user selects the appropriate parameters, the user may submit the action via the submit button 213, or cancel the operation via the cancel button 214.

Figure 3:
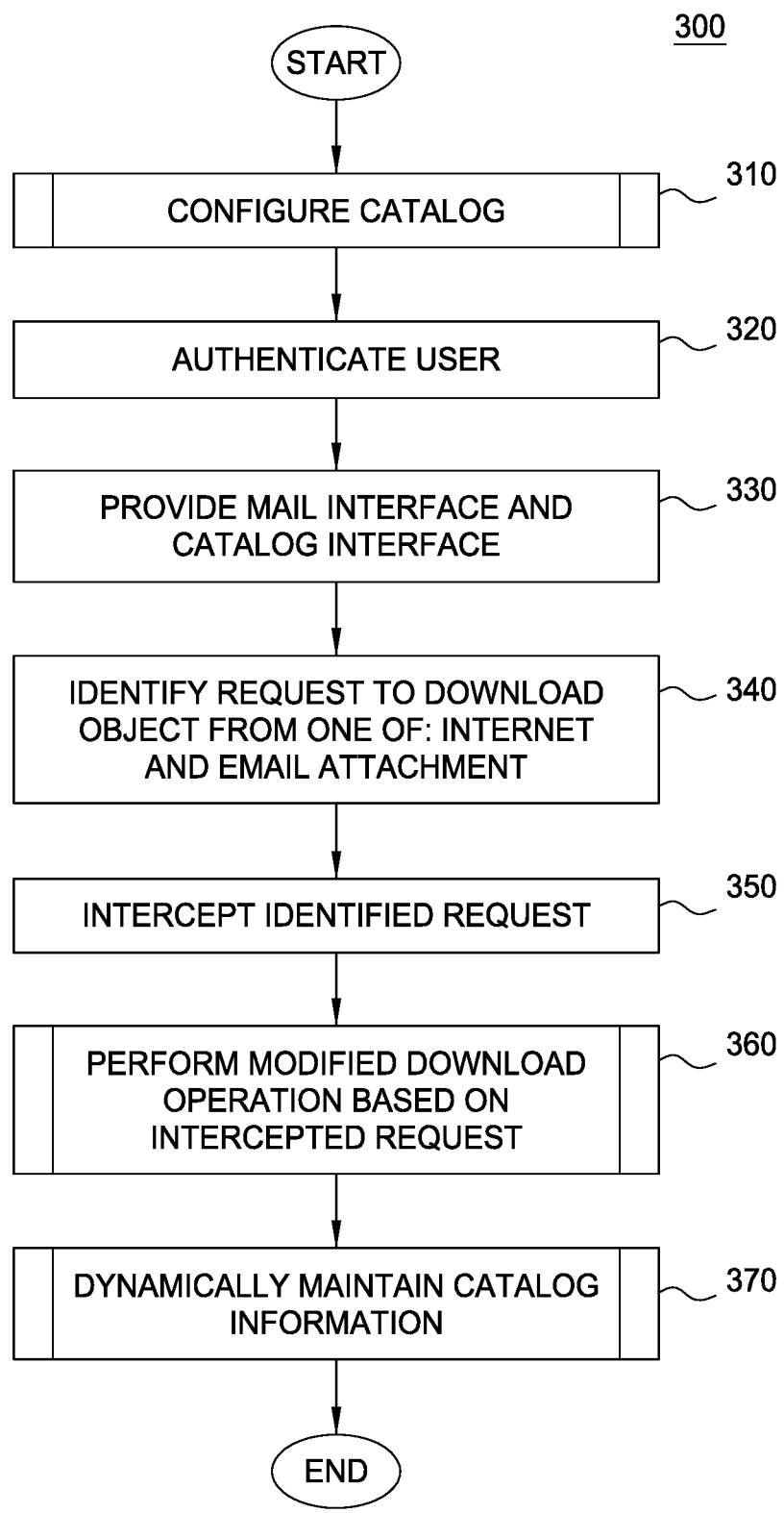
FIG. 3 is a flow chart illustrating an example method to provide an integrated file catalog, according to one embodiment.

FIG. 3 is a flow chart illustrating an example method 300 to provide an integrated file catalog, according to one embodiment. As shown, the method 300 begins at block 310, described in greater detail with reference to FIG. 4, where a user may configure the catalog 109. Generally, the user may select options related to the catalog 109, specify devices that the user owns or accesses, and the like. At block 320, the user profile module 104 may authenticate the user. The user profile module 104 may authenticate the user via any feasible method, such as a login and password, biometric identifiers (such as an iris scan or fingerprint scan), and the like. At block 330, an interface (such as the GUI 201) is presented to the user, where the interface provides access to the user's email and catalog 109. At block 340, the download module 104 may identify a user-generated request to download an object. For example, the user may specify to detach a file from an email, or download a file from the Internet. The download module 104 may identify the request to download the object using any feasible method, such as packet inspection to identify a hypertext transfer protocol (HTTP) GET request generated by an application executing on the computing device, and the like.

At block 350, the download module 104 may intercept the identified request, such that the requested operation is not immediately performed. Instead, at block 360, described in greater detail with reference to FIG. 5, the download module 104 may perform a modified download operation based on the request intercepted at block 350. Generally, at block 360, the download module 105 may determine whether an entry for the requested file or attachment exists in the catalog 109. If so, the download module 104 may modify the download operation based on user input as described above. For example, the download module 104 may download the file from a peer device on the LAN 131, allow the user to open the file from the peer device, and the like. Similarly, if an entry does not exist in the catalog 109, the download module 105 may download the file accordingly. At block 370, the user profile module 104, the download module 105, and the tracking daemon 123 may dynamically maintain the information stored in the catalog 109. For example, when a new file is downloaded, the catalog 109 may be enriched with metadata describing the new file. Similarly, if a file is downloaded to a new machine, the catalog 109 may be updated to reflect the new storage location for the file (in addition to other existing locations). Further still, if a file is deleted or moved, the catalog 109 is updated to reflect the changes.

Figure 4:
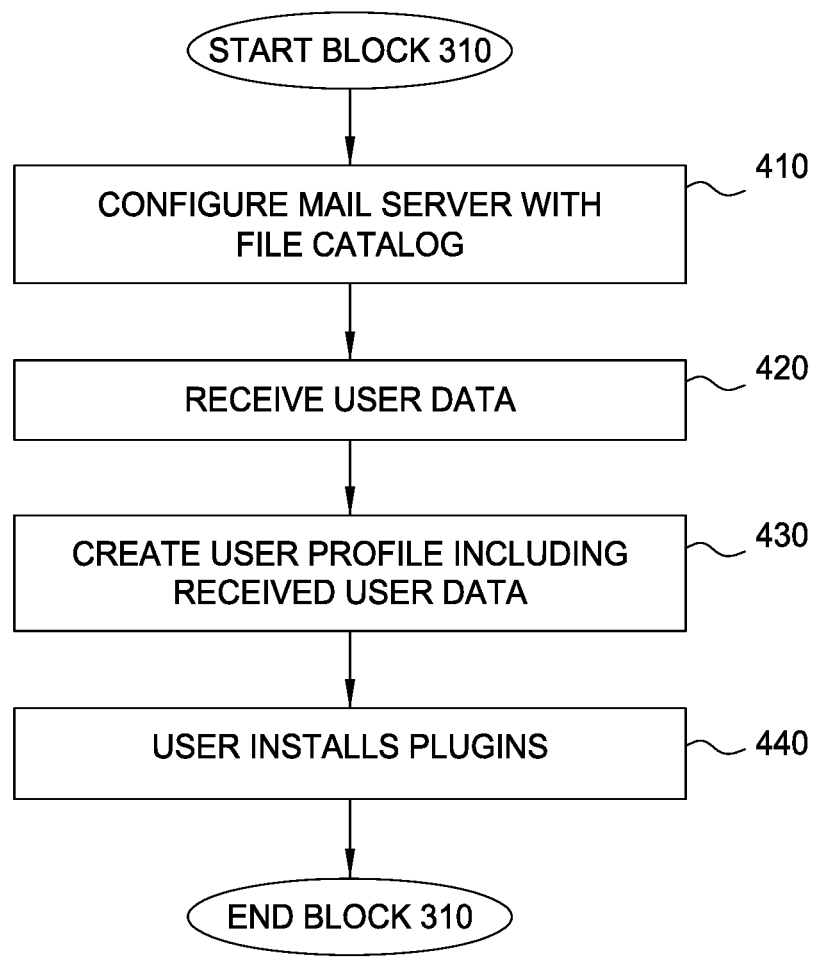
FIG. 4 is a flow chart illustrating an example method to configure an integrated file catalog, according to one embodiment.

FIG. 4 is a flow chart illustrating an example method 400 corresponding to block 310 to configure an integrated file catalog, according to one embodiment. As shown, the method 400 begins at block 410, where a user (such as a system administrator) configures the mail server 101 to include the catalog 109 for each of a plurality of different users. Generally, each user account of the email server includes an email account 107, a user profile 108, and a catalog 109. At block 420, the email server 101 may receive user data. The user data may include user profile data, such as the user's name, email alias, associated devices (e.g., a laptop, smartphone, and tablet computer), and the like. The user may also specify which options and functionalities the user wishes to have activated. At block 430, the email server 101 may create a user profile for the user which includes the information provided by the user at block 420. The user profile may also include a user identifier for the user, and used to identify objects in the catalog 109 associated with the user. At block 440, the user may install plugins on one or more computing devices. For example, the user may install the user profile module 104, the download module 105, and/or the tracking daemon 123 on their laptop and smartphone. The user may further configure options for each module.

Figure 5:
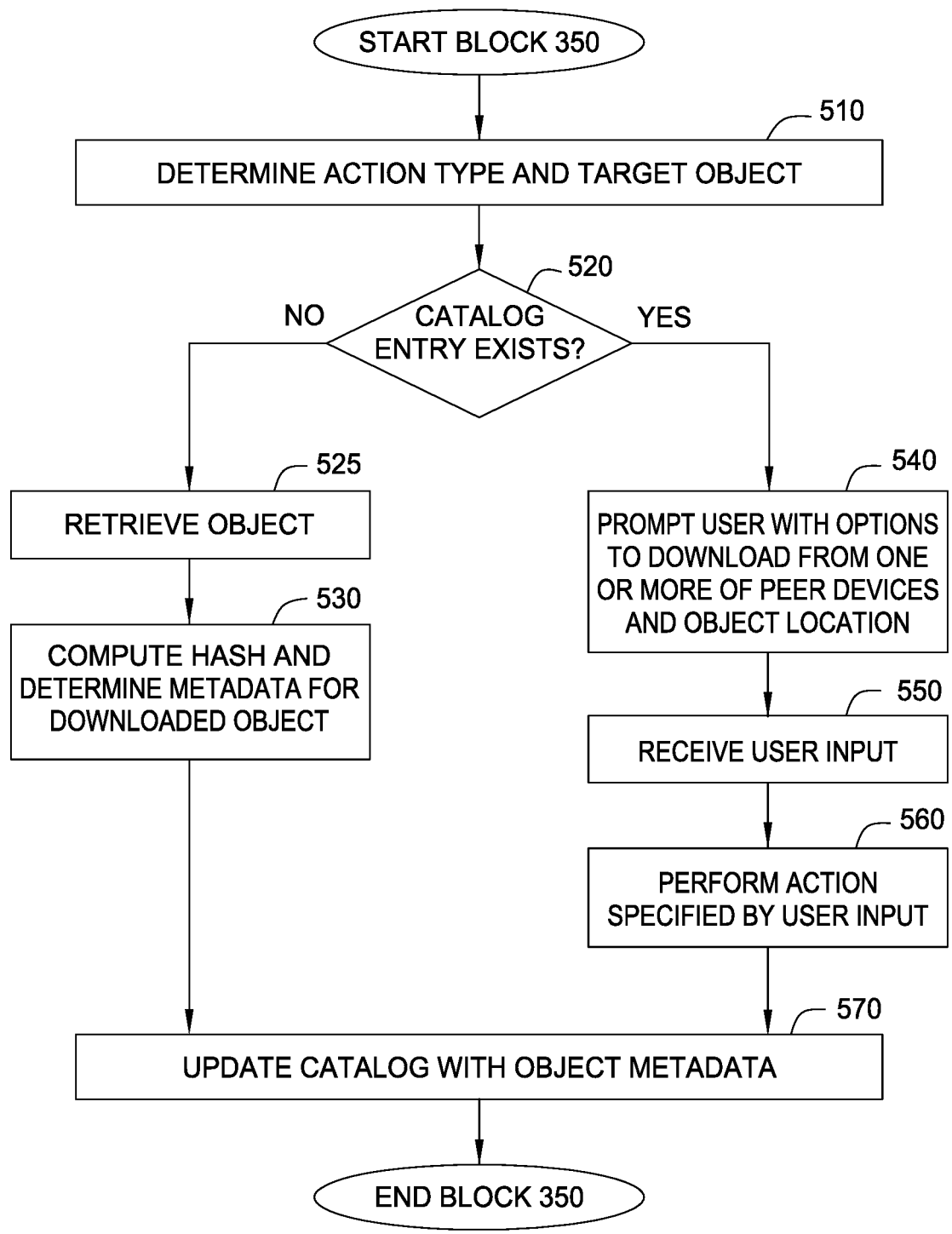
FIG. 5 is a flow chart illustrating an example method to perform a modified download operation based on an intercepted request, according to one embodiment.

FIG. 5 is a flow chart illustrating an example method 500 corresponding to block 350 to perform a modified download operation based on an intercepted request, according to one embodiment. Generally, the download module 105 may perform the steps of the method 500. As shown, the method 500 begins at block 510, where the download module 105 determines an action type and a target object of the intercepted request. For example, the action type may be an Internet file download and the target object may be a file located at a URL. As another example, the action type may be an email detachment, and the target object is a file attached to an email. At block 520, the download module 105 determines whether an entry for the object exists in the catalog 109. For example, the download module 105 may reference the catalog 109 for an entry matching a previously stored hash value for the target object, or a received hash value which is metadata of an Internet file. Similarly, the download module 105 may reference the catalog for an entry having the same file name and/or URL as the target object. Generally, the download module 105 may reference the catalog 109 using any set of known attributes which may identify the target object, such as one or more of the object name, object size, object creation date, object URL, and object hash value. If a matching entry in the catalog 109 does not exist, the download module 105 proceeds to block 525. At block 525, the download module 105 may retrieve the object. For example, the download module 105 may download the object from the URL associated with the object, and store the object at a storage location specified by the user. At block 530, the download module 105 may compute a hash value for the downloaded object using a hash function. The download module 105 may also determine other metadata attributes for the downloaded object, such as the file name, size, storage location, and associated storage device. The download module 105 may then updated the catalog 109 with the object metadata at block 570.

Returning to block 520, if an entry in the catalog 109 exists, the download module 105 proceeds to block 540, where the user is prompted with options for downloading the object, such as those depicted in FIG. 2B. For example, the user may choose to download the object from a peer device, open the object from the peer device, open the object from the current device (if the file is present on the current device), and the like. At block 550, the user may provide input specifying a requested action. For example, the user may request to open the file read-only from a peer device on the LAN 131. At block 560, the download module 105 may perform the action specified by the user. At block 570, the download module 105 may update the catalog 109 with updated object metadata. For example, if the user saves a new copy of a file, the download module 105 may update the catalog 109 to include the storage location of the new copy of the file.

Figure 6:
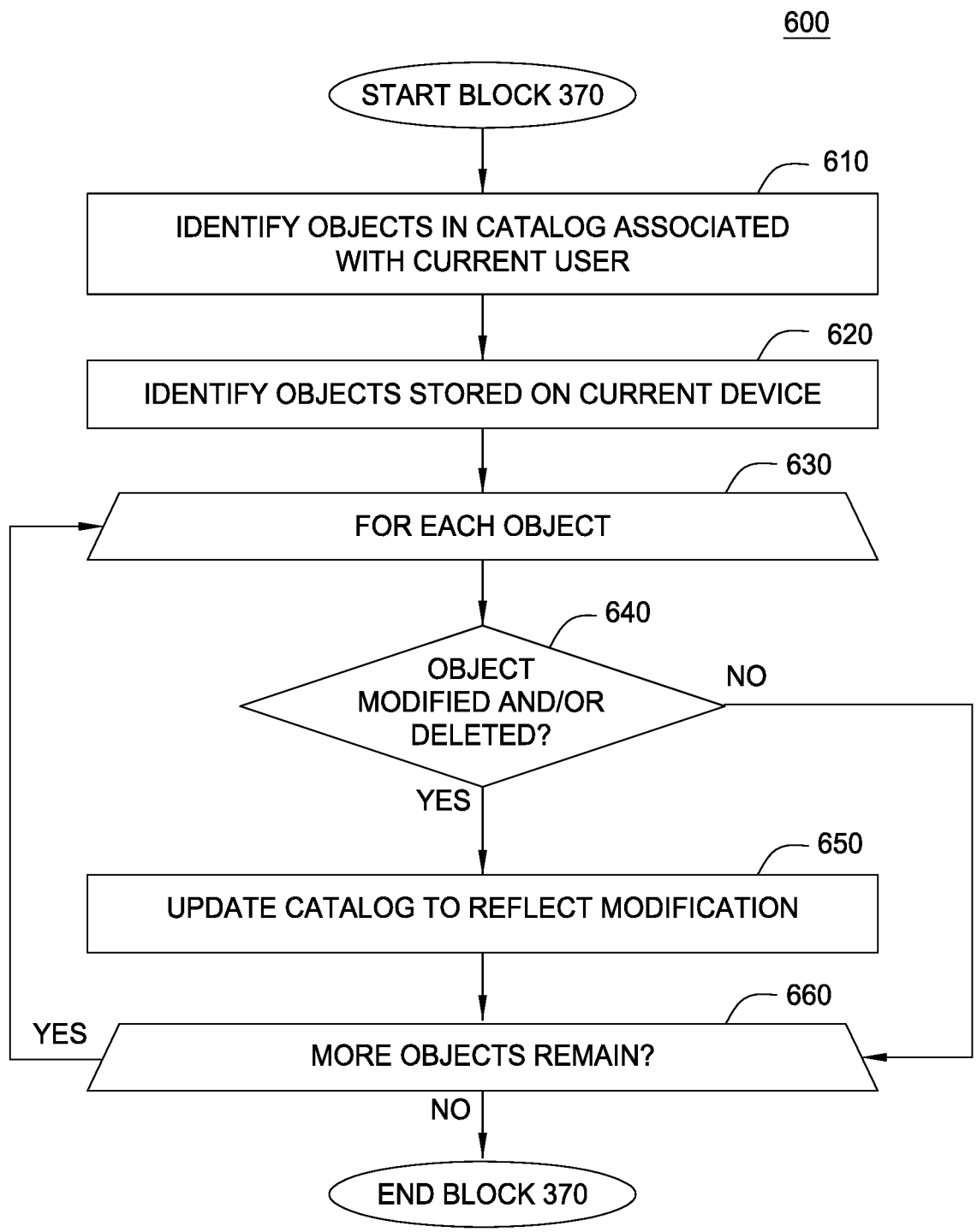
FIG. 6 is a flow chart illustrating an example method to dynamically maintain catalog information, according to one embodiment.

FIG. 6 is a flow chart illustrating an example method 600 corresponding to block 370 to dynamically maintain catalog information, according to one embodiment. In at least one embodiment, the user profile module 104 and/or the tracking daemon 123 perform the method 600. As shown, the method 600 begins at block 610, where the user profile module 104 identifies objects in the catalog associated with the current user. At block 620, when a user logs in to their email account and/or the object catalog 109 using a registered computing device, the tracking daemon 123 may identify the objects stored on the current computing device (and/or on an external storage attached to the current computing device). Doing so may produce a list of objects stored on the device the user is accessing email and/or the catalog 109 from. At block 630, a loop including blocks 640-660 may be performed for each object in the catalog 109 that indicates the object is stored on the current computing device.

At block 640, the tracking daemon 123 may determine whether the current object that is in the catalog 109 has been modified and/or deleted from the current computing device. If the current object has been modified on the current computing device and/or has been deleted from the current computing device, the method proceeds to block 650, where the user profile module 104 updates the catalog 109 to reflect the modification and/or deletion. For example, if a file is deleted from a user's smart phone, the user profile module 104 may remove the smartphone storage location from the entry for the file in the catalog 109 (however, other copies of the file may be remain on other devices, and the catalog 109 still reflects these instances). The method may then proceed to block 660.

Returning to block 640, if the current catalog 109 object has not been modified and/or deleted from the current device, the catalog 109 does not need to be updated to reflect any deletions and/or modifications. Therefore, the method proceeds to block 660, where the tracking daemon 123 determines whether more objects remain. If more objects remain, the tracking daemon 123 returns to block 630 to determine whether these objects, listed in the catalog 109 as being stored on the current computing device, still remain on the current computing device (or have otherwise been modified). If no more objects remain, the method 600 ends.

Figure 7:
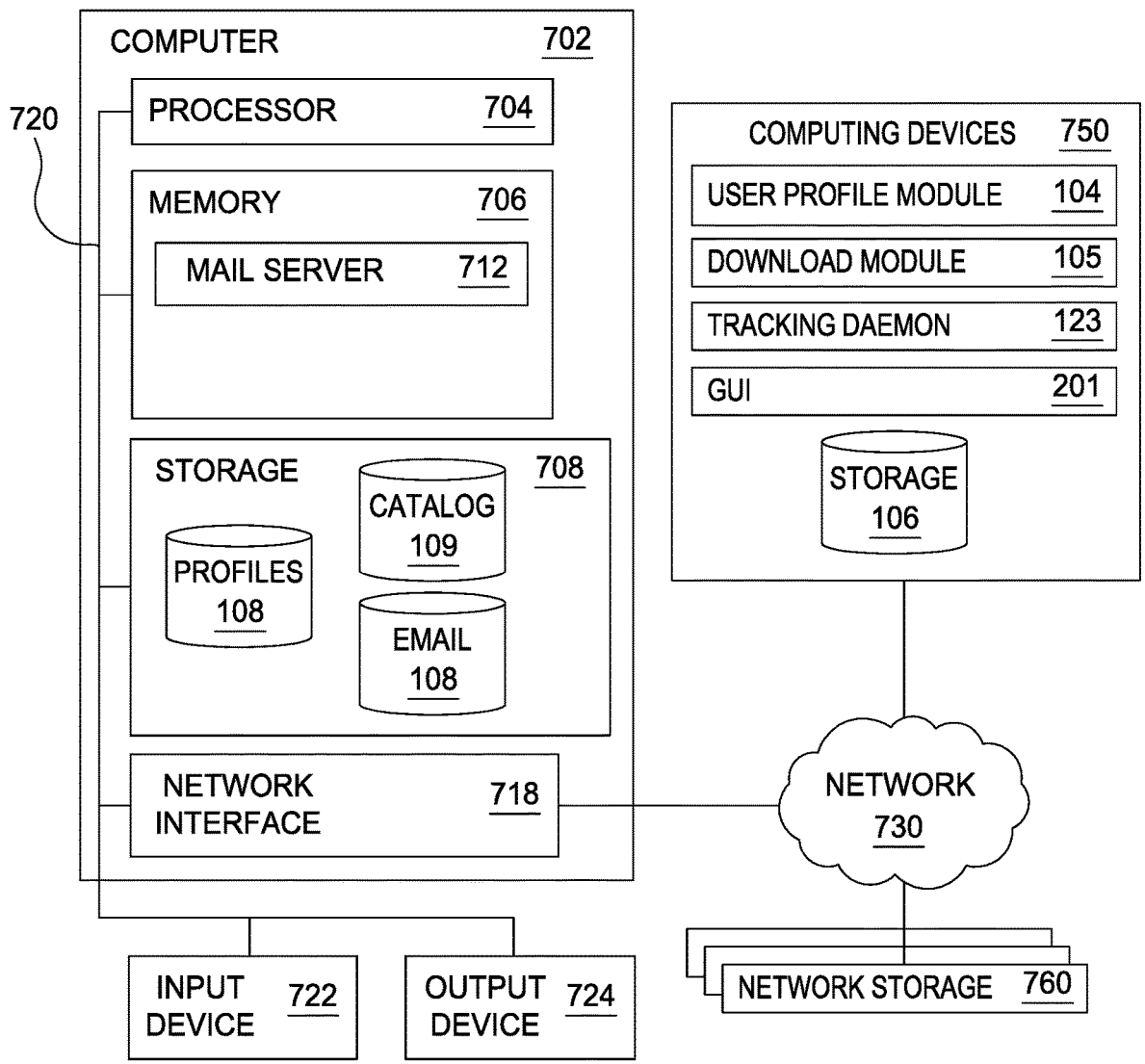
FIG. 7 illustrates an example system which provides an integrated file catalog, according to one embodiment.

FIG. 7 illustrates an example system 700 which provides an integrated file catalog, according to one embodiment. The networked system 700 includes a computer 702. The computer 702 may also be connected to other computers via a network 730. In general, the network 730 may be a telecommunications network and/or a wide area network (WAN). In a particular embodiment, the network 730 is the Internet.

The computer 702 generally includes a processor 704 which obtains instructions and data via a bus 720 from a memory 706 and/or a storage 708. The computer 702 may also include one or more network interface devices 718, input devices 722, and output devices 724 connected to the bus 720. The computer 702 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the computer 702 to communicate with other computers via the network 730.

The storage 708 is representative of hard-disk drives, solid state drives, flash memory devices, optical media and the like. Generally, the storage 708 stores application programs and data for use by the computer 702. In addition, the memory 706 and the storage 708 may be considered to include memory physically located elsewhere; for example, on another computer coupled to the computer 702 via the bus 720.

The input device 722 may be any device for providing input to the computer 702. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the computer 702. The output device 724 may include output devices such as monitors, touch screen displays, and so on.

As shown, the memory 706 contains a mail server 712, which generally configured to provide and manage a plurality of user email accounts. As shown, the storage 708 contains the user profiles 108, catalog 109, and emails 110. A given user profile may be associated with a respective catalog 109 and a plurality of emails 110.

As shown, a plurality of computing devices 750 may be connected to the network 730. The computing devices 750 include at least a processor, memory, a network interface, and other suitable hardware and software. As shown, the computing devices 750 include the user profile module 104, the download module 105, the tracking daemon 123, and the GUI 201. Generally, the computing devices 750 and the computer 702 are configured to implement all systems, methods, and functionality described above with reference to FIGS. 1-6.

As shown, the system 700 also includes network storage 760, which are representative of network storage devices that users may save files to, and retrieve files from. The user profile module 104, download module 105, and tracking daemon 123 may reference the network storage 760 to implement the functionality described above.

Advantageously, embodiments disclosed herein provide a catalog 109 in a mail server for each of a plurality of users. The catalog 109 allows users to receive a quick, detailed picture of the files he or she has saved on a plurality of different machines by logging into their email account and viewing their catalog. Regardless of where the files are saved, embodiments disclosed herein allow users to manage files downloaded from email attachments and the Internet. Advantageously, computers, computer networks, and email systems are improved by the disclosure by reducing the number of repeat downloads of the same file, saving time, external network traffic, and costs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the user profile module 104 could execute on a computing system in the cloud. In such a case, the user profile module 104 may store profile data for a plurality of users at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving a first request to download, by a first computing device of a plurality of computing devices in a local network, a first object, wherein the first request indicates that the first object is stored at a first location outside of the local network;
prior to completing the first request to download the first object, searching an object catalog in a mail server using an identifier associated with the first object, wherein the object catalog includes a first plurality of pointers to a first plurality of objects stored on one or more devices in the local network, and wherein the first plurality of objects are stored separately from the object catalog;
determining that the first object is not available on any of the plurality of computing devices in the local network, based on determining that the object catalog does not include the identifier of the first object;
upon determining that the first object is not available on any of the plurality of computing devices in the local network:
downloading the first object from the first location outside of the local network;
storing the first object at a first storage location on the first computing device;
computing a hash value for the first object; and
storing a record associated with the first object in the object catalog, wherein the record includes an indication of the hash value and the first storage location on the first computing device;
receiving a second request to download, by the first computing device, a second object, wherein the second request indicates that the second object is stored at a second location outside of the local network; and
prior to completing the second request to download the second object, searching the object catalog in the mail server using an identifier associated with the second object;
determining that the second object is available on at least one of the plurality of computing devices in the local network, based on determining that the object catalog includes an entry associated with the identifier of the second object; and
upon determining that the second object is available on at least one of the plurality of computing devices in the local network:
refraining from downloading the second object from the second location outside of the local network.

2. The method of claim 1, further comprising:
identifying a network location in the local network where the second object is stored, wherein the network location is of a second storage device associated with a second computing device of the plurality of computing devices in the local network; and
receiving, by the first computing device, the second object from the network location of the second storage device.

3. The method of claim 1, further comprising:
authenticating a user on the first computing device;
identifying a second plurality of objects defined in the object catalog in the mail server as being stored on the first computing device, wherein the second plurality of objects includes the first object and a second object;
searching for each of the second plurality of objects on the first computing device;
determining that the second object has been deleted from the first computing device; and
modifying the object catalog to reflect that the second object is not stored on the first computing device.

4. The method of claim 1, further comprising:
receiving a request to download a second object by the first computing device;
searching the object catalog in the mail server using an identifier associated with the second object, wherein the identifier comprises one or more of: (i) a name of the second object, (ii) a uniform resource locator of the second object, or (iii) a hash value computed for the second object;
upon determining that the object catalog includes an entry associated with the identifier of the second object:
identifying a plurality of network locations in the local network where the second object is stored, wherein each of the plurality of network locations are associated with one or more of the plurality of computing devices in the local network;
outputting for display an indication of each of the plurality of network locations in the local network where the second object is stored;
receiving user input specifying to download the second object from a first network location of the plurality of network locations in the local network where the second object is stored; and
receiving, by the first computing device, the second object from the first network location of the plurality of network locations.

5. The method of claim 4, wherein the request to download the first object comprises one of: (i) a request to detach the first object from an email stored in the mail server, or (ii) a request to download the first object from a uniform resource locator (URL), wherein the second object is received via Simple Mail Transfer Protocol (SMTP).

6. The method of claim 1, further comprising:
receiving, from a user, a request to view a listing of objects in the object catalog defined as being associated with the user, wherein the object catalog is stored in an email account associated with the user in the mail server;
identifying, from the object catalog, each of a second plurality of objects defined as being associated with the user; and
outputting, in a graphical user interface (GUI):
a listing of each of the second plurality of objects defined as being associated with the user; and
at least one email of the email account associated with the user.

7. The method of claim 1, further comprising:
receiving a request to download the first object by a second computing device, of the plurality of computing devices in the local network;
referencing the object catalog in the mail server using the identifier associated with the first object;
determining, based on referencing the object catalog using the identifier associated with the first object, that the first object is stored on the first computing device; and
receiving, by the second computing device, the first object from the first computing device via the local network.

8. A computer program product, comprising: a non-transitory computer-readable storage medium having computer readable program code embodied therewith, the computer readable program code executable by a processor to perform an operation comprising:
receiving a first request to download, by a first computing device of a plurality of computing devices in a local network, a first object, wherein the first request indicates that the first object is stored at a first location outside of the local network;
prior to completing the first request to download the first object, searching an object catalog in a mail server using an identifier associated with the first object, wherein the object catalog includes a plurality of pointers to a plurality of objects stored on one or more devices in the local network, and wherein the plurality of objects are stored separately from the object catalog;
determining that the first object is not available on any of the plurality of computing devices in the local network, based on determining that the object catalog does not include the identifier of the first object;
upon determining that the first object is not available on any of the plurality of computing devices in the local network:
downloading the first object from the first location outside of the local network;
storing the first object at a first storage location on the first computing device;
computing a hash value for the first object; and
storing a record associated with the first object in the object catalog, wherein the record includes an indication of the hash value and the first storage location on the first computing device;
receiving a second request to download, by the first computing device, a second object, wherein the second request indicates that the second object is stored at a second location outside of the local network; and
prior to completing the second request to download the second object, searching the object catalog in the mail server using an identifier associated with the second object;
determining that the second object is available on at least one of the plurality of computing devices in the local network, based on determining that the object catalog includes an entry associated with the identifier of the second object; and
upon determining that the second object is available on at least one of the plurality of computing devices in the local network:
refraining from downloading the second object from the second location outside of the local network.

9. The computer program product of claim 8, the operation further comprising:
identifying a network location in the local network where the first object is stored, wherein the network location is of a second storage device associated with a second computing device of the plurality of computing devices in the local network; and
receiving, by the first computing device, the second object from the network location of the second storage device.

10. The computer program product of claim 8, the operation further comprising:
authenticating a user on the first computing device;
identifying a second plurality of objects defined in the object catalog in the mail server as being stored on the first computing device, wherein the second plurality of objects includes the first object and a second object;
searching for each of the second plurality of objects on the first computing device;
determining that the second object has been deleted from the first computing device; and
modifying the object catalog to reflect that the second object is not stored on the first computing device.

11. The computer program product of claim 8, the operation further comprising:
receiving a request to download a second object by the first computing device;
referencing the object catalog in the mail server using an identifier associated with the second object, wherein the identifier comprises one or more of: (i) a name of the second object, (ii) a uniform resource locator of the second object, or (iii) a hash value computed for the second object;
upon determining that the object catalog includes an entry associated with the identifier of the second object:
identifying a plurality of network locations in the local network where the second object is stored, wherein each of the plurality of network locations are associated with one or more of the plurality of computing devices in the local network;
outputting for display an indication of each of the plurality of network locations in the local network where the second object is stored;
receiving user input specifying to download the second object from a first network location of the plurality of network locations in the local network where the second object is stored; and
receiving, by the first computing device, the second object from the first network location of the plurality of network locations.

12. The computer program product of claim 11, wherein the request to download the first object comprises one of: (i) a request to detach the first object from an email stored in the mail server, or (ii) a request to download the first object from a uniform resource locator (URL), wherein the second object is received via Simple Mail Transfer Protocol (SMTP).

13. The computer program product of claim 8, the operation further comprising:

receiving, from a user, a request to view a listing of objects in the object catalog defined as being associated with the user, wherein the object catalog is stored in an email account associated with the user in the mail server;

identifying, from the object catalog, each of a second plurality of objects defined as being associated with the user; and outputting, in a graphical user interface (GUI):
a listing of each of the second plurality of objects defined as being associated with the user; and
at least one email of the email account associated with the user.

14. The computer program product of claim 8, the operation further comprising:
receiving a request to download the first object by a second computing device, of the plurality of computing devices in the local network;
referencing the object catalog in the mail server using the identifier associated with the first object;
determining, based on referencing the object catalog using the identifier associated with the first object, that the first object is stored on the first computing device; and
receiving, by the second computing device, the first object from the first computing device via the local network.

15. A system, comprising:
a processor; and
a memory storing one or more instructions which, when executed by the processor, performs an operation comprising:
receiving a first request to download, by a first computing device of a plurality of computing devices in a local network, a first object, wherein the first request indicates that the first object is stored at a first location outside of the local network;
prior to completing the first request to download the first object, searching an object catalog in a mail server using an identifier associated with the first object, wherein the object catalog includes a plurality of pointers to a plurality of objects stored on one or more devices in the local network, and wherein the plurality of objects are stored separately from the object catalog; and
determining that the first object is not available on any of the plurality of computing devices in the local network, based on determining that the object catalog does not include the identifier of the first object;
upon determining that the first object is not available on any of the plurality of computing devices in the local network:
downloading the first object from the first location outside of the local network;
storing the first object at a first storage location on the first computing device;
computing a hash value for the first object; and
storing a record associated with the first object in the object catalog, wherein the record includes an indication of the hash value and the first storage location on the first computing device;
receiving a second request to download, by the first computing device, a second object, wherein the second request indicates that the second object is stored at a second location outside of the local network; and
prior to completing the second request to download the second object, searching the object catalog in the mail server using an identifier associated with the second object;
determining that the second object is available on at least one of the plurality of computing devices in the local network, based on determining that the object catalog includes an entry associated with the identifier of the second object; and
upon determining that the second object is available on at least one of the plurality of computing devices in the local network:
refraining from downloading the second object from the second location outside of the local network.

16. The system of claim 15, the operation further comprising:
identifying a network location in the local network where the second object is stored, wherein the network location is of a second storage device associated with a second computing device of the plurality of computing devices in the local network; and
receiving, by the first computing device, the second object from the network location of the second storage device.

17. The system of claim 15, the operation further comprising:
authenticating a user on the first computing device;
identifying a second plurality of objects defined in the object catalog in the mail server as being stored on the first computing device, wherein the second plurality of objects includes the first object and a second object;
searching for each of the second plurality of objects on the first computing device;
determining that the second object has been deleted from the first computing device; and
modifying the object catalog to reflect that the second object is not stored on the first computing device.

18. The system of claim 15, the operation further comprising:
receiving a request to download a second object by the first computing device;
referencing the object catalog in the mail server using an identifier associated with the second object, wherein the identifier comprises one or more of: (i) a name of the second object, (ii) a uniform resource locator of the second object, or (iii) a hash value computed for the second object;
upon determining that the object catalog includes an entry associated with the identifier of the second object:
identifying a plurality of network locations in the local network where the second object is stored, wherein each of the plurality of network locations are associated with one or more of the plurality of computing devices in the local network;
outputting for display an indication of each of the plurality of network locations in the local network where the second object is stored;
receiving user input specifying to download the second object from a first network location of the plurality of network locations in the local network where the second object is stored; and
receiving, by the first computing device, the second object from the first network location of the plurality of network locations.

19. The system of claim 18, wherein the request to download the first object comprises one of: (i) a request to detach the first object from an email stored in the mail server, or (ii) a request to download the first object from a uniform resource locator (URL), wherein the second object is received via Simple Mail Transfer Protocol (SMTP).

20. The system of claim 15, the operation further comprising:
   receiving, from a user, a request to view a listing of objects in the object catalog defined as being associated with the user, wherein the object catalog is stored in an email account associated with the user in the mail server;
   identifying, from the object catalog, each of a second plurality of objects defined as being associated with the user; and
   outputting, in a graphical user interface (GUI):
      a listing of each of the second plurality of objects defined as being associated with the user; and
      at least one email of the email account associated with the user.

* * * * *